Jan. 17, 1961   E. W. VERES   2,968,405
SINTERED METAL FILTER AND METHOD OF MAKING
Filed Jan. 21, 1959   2 Sheets-Sheet 1
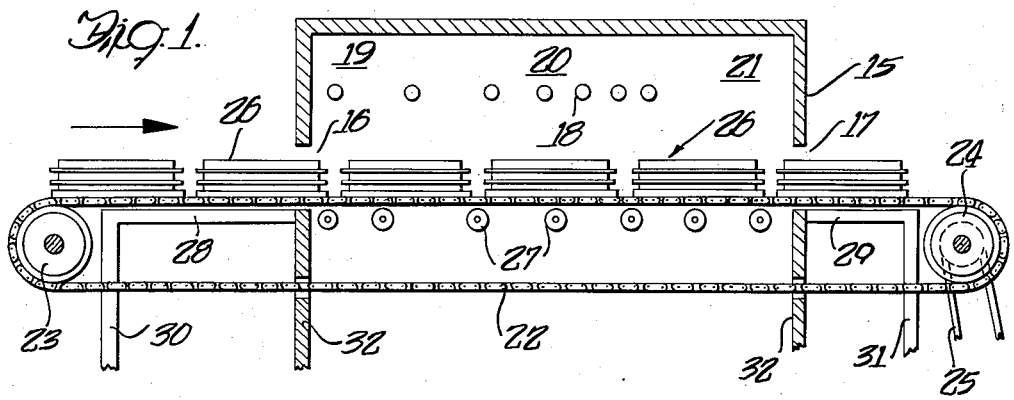
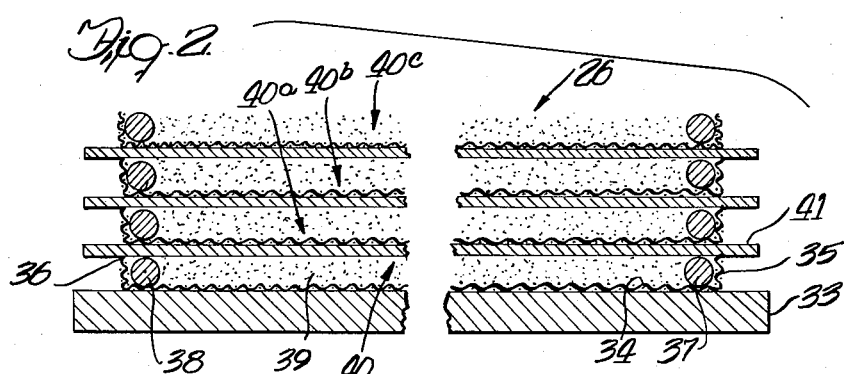
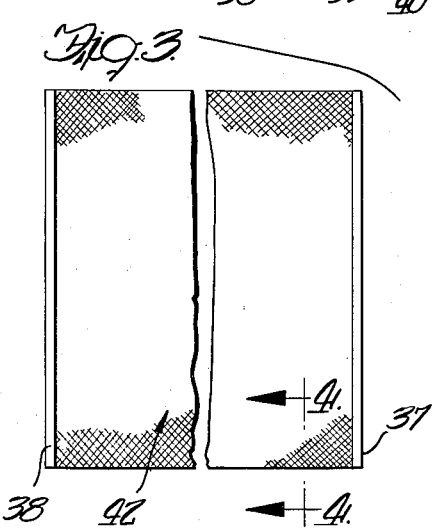
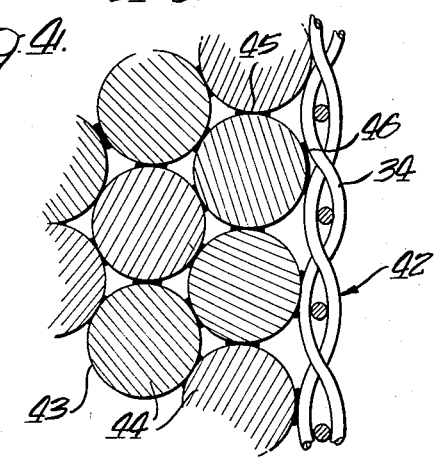
Inventor
Edward W. Veres
John W. Graham
Attorney Jan. 17, 1961 E. W. VERES 2,968,405
SINTERED METAL FILTER AND METHOD OF MAKING
Filed Jan. 21, 1959 2 Sheets-Sheet 2
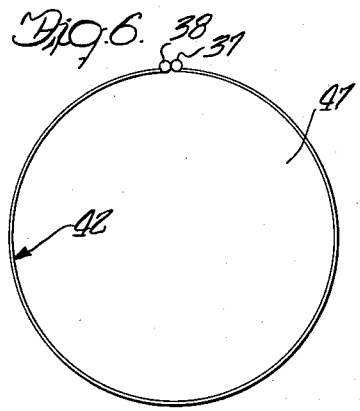
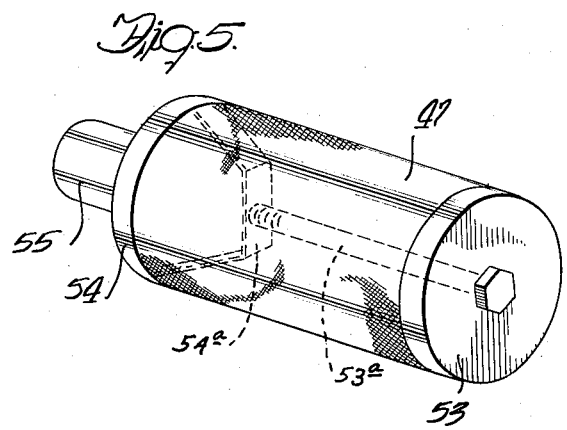
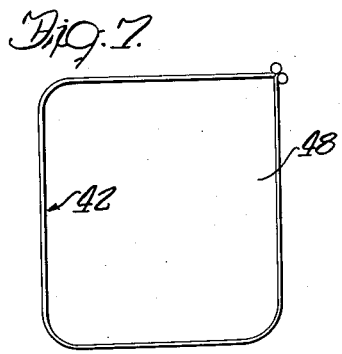
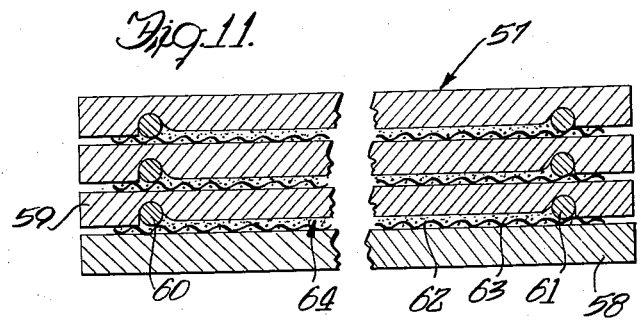
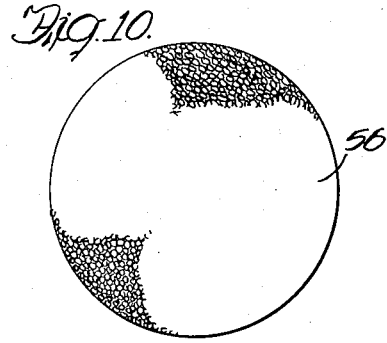
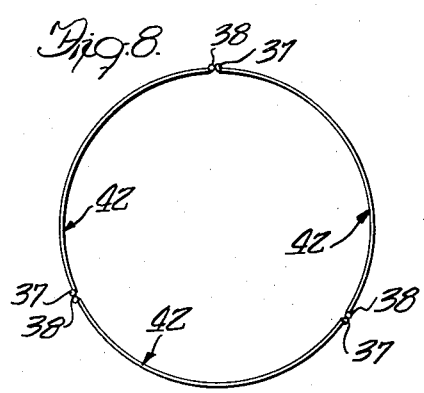
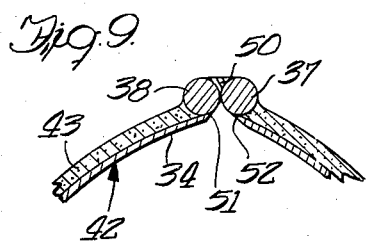
Inventor
Edward W. Veres
John W. Graham
Attorney United States Patent Office 2,968,405
Patented Jan. 17, 1961

2,968,405

SINTERED METAL FILTER AND METHOD OF MAKING

Edward W. Veres, Arlington Heights, Ill., assignor to Arrow Tools, Inc., Chicago, Ill., a corporation of Illinois Filed Jan. 21, 1959, Ser. No. 790,788

8 Claims. (Cl. 210—496)

This invention relates to a method of fabricating sintered metal products, and more especially to a method of making sintered metal filters and to such filter product.

This application is a continuation-in-part of my copending application, Serial No. 625,135, now Patent No. 2,877,903, filed November 29, 1956, and entitled Filter Unit.

Sintered metal products are comprised of a vast number of metal particles or pellets that are secured to each other at their points of contact. The particles are relatively small, but may be purchased in sizes that range upward from several microns. The particles ordinarily have smoothly curved surfaces and are somewhat spherical, and in this sense may be contrasted with particles which have roughened or irregular surface characteristics. A common composition for sintered metal particles is a copper or bronze center enclosed or sheathed in tin.

In forming a product of such material, the particles are placed in a die to determine a configuration therefor, and are then heated to a temperature sufficient to soften the tin coating and thereby effect a bond between the particles at the points of contact thereof. It has been found that it is extremely difficult to shape a product so formed by bending because the bond between the particles is relatively weak and readily fractured, as of course is the case with any solder joint. This difficulty is particularly applicable to sintered metal filters because the sintered filter must be quite porous to permit the flow of fluid therethrough; and thus, in the bonding step, substantially no pressure or compressive force can be applied to the particles so that the bonds therebetween are even more fracturable.

As a consequence of this, the traditional process employed in fabricating sintered metal products is to provide expensive molds, fill the molds with the particles, and advance the filled molds through a sintering oven which elevates the temperature of the particles to effect the bond therebetween. After cooling, the product thus formed can be removed from the mold, whereupon the process is repeated using the same mold. It is readily apparent that the fabrication of products in this manner is costly for a number of reasons.

First, because the molds are expensive, and their cost must be justified in the price charged for the fabricated product, and these costs are further increased through the necessity of frequent mold replacement due to the deterioration thereof from repeated heatings in the furnace. Furthermore, the molds are often quite large and bulky, depending upon the size and shape of the product being made, and thus occupy a substantial furnace volume thereby imposing serious limits on the number of products which can be heated at any given time. In this sense then, the full furnace capacity is not productively utilized. Moreover, the capacity of the sintering furnace is related to the weight or mass to be heated thereby or, stated another way, it takes a far shorter time to elevate the temperature of one pound of material than of ten pounds of the same material. Since molds are fairly bulky, and since the temperature thereof must be elevated in order to heat the contents therein, the time of the heating cycle is disproportionately increased especially, as is most frequently the case, where the molds are formed of carbon or other material having a low thermal conductivity. Again, it may be said that these fabrication problems are accentuated in making filters for they are often large bulky products.

With a view toward overcoming these problems, an object of the present invention is to provide an improved sintered metal product and method of fabricating the same. Another object of the invention is in the provision of a low cost sintered metal product exemplified by a filter unit, and an economical method of making the same. Still another object is that of providing a method of making sintered metal filters and like products, that utilizes the full capacity of the sintering furnace and which enables the product to be shaped subsequent to the formation of the particles into an integral unit.

Yet another object of this invention is to provide a method of making sintered metal filters, wherein the use of dies can be obviated or simple inexpensive dies employed, by bonding the particles or pellets to form generally flat pieces, thus permitting utilization of the full furnace capacity in that excessive furnace space is not occupied by irregular shapes, and actually increasing the furnace capacity in that the units may be stacked one upon another.

Yet a further object of the invention is that of providing a filter unit of tubular or cylindrical configuration, which is bent into the desired shape after the formation of a flat sintered metal unit, and which has improved and uniform filtering characteristics throughout the surface area thereof because the weight of a heavy die exerting compressive forces on the particles during the bonding thereof is not necessitated. Additional objects and advantages will become apparent as the specification develops.

Embodiments of the invention, both as to structure and method, are illustrated in the accompanying drawings, in which—

Figure 1 is a longitudinal sectional view largely diagrammatic in character of a sintering oven or furnace, and showing a step in the fabricating process; Figure 2 is an enlarged, longitudinal sectional view of a group of stacked sintered metal units arranged for passage through the furnace; Figure 3 is an enlarged, top plan view of a sintered metal unit formed in accordance with the invention; Figure 4 is a greatly enlarged, vertical sectional view taken along the line 4—4 of Figure 3; Figure 5 is a perspective view of a filter product formed in accordance with the invention; Figure 6 is a top plan view of the unit shown in Figure 3 after the same has been curved into a round cylinder to define the configuration shown in Figure 5; Figure 7 is a top plan view similar to that of Figure 6, but showing a varied cylindrical configuration—more particularly, prismatic; Figure 8 is a top plan view similar to that of Figures 6 and 7, but showing a segmented filter unit; Figure 9 is an enlarged, broken sectional view illustrating the character of the joints of Figures 6 through 8, which maintain the filter units in the configuration shown; Figure 10 is a top plan view of a flat disc stamped from the filter unit shown in Figure 3; and Figure 11 is an enlarged, longitudinal sectional view similar to that of Figure 2, but showing a modified stacked arrangement of the units for passage through the sintering furnace.

An oven or furnace which may be used in forming the sintered metal units is illustrated diagrammatically in Figure 1, and is seen to comprise an oven 15 having an entrance opening 16 and an exit opening 17. The furnace is equipped with a plurality of heaters which may be gas jets 18, and ordinarily will be divided into three sections—a pre-heat section indicated generally with the numeral 19, the main heating section 20, and a cooling section 21. An endless conveyor 22 formed of metal links has one leg thereof passing through the furnace and is entrained about pulleys 23 and 24. The latter of which may be driven as through a belt 25 operatively connected with a motor (not shown). The conveyor 22 is preferably supported at least along the upper leg thereof which carries a plurality of stacks 26, and this may be accomplished by any suitable means as through the use of support rollers 27 rotatably mounted within the furnace and platforms 28 and 29 equipped, respectively, with legs 30 and 31. The furnace may be carried by legs 32.

With respect to the instant invention, the furnace 15, conveyor 22 and associated components may be wholly conventional, and the function thereof is to advance the stacks 26 from left to right (as viewed in Figure 1) through the furnace 15 at a velocity such that the stacks will be heated to a predetermined temperature to cause a bonding between the adjacent sintered metal particles which comprise a part of each stack. Usually, the conveyor 22 travels very slowly, and its movement is barely noticeable. However, the conveyor velocity must be related to the temperature of the furnace and to the time that each stack must remain to assure the requisite temperature rise thereof. By way of example, it has been found that in the fabrication of filter units and where sintered metal comprising solder-coated copper particles are employed, a temperature of about 1,600° F. should be attained to effectuate a satisfactory bonding of the particles.

A stack 26 is illustrated in detail in Figure 2, and is seen to comprise a flat support 33 that may be formed of carbon or graphite (which is preferred because they are relatively inexpensive) or other material which is capable of withstanding the temperatures of the heating furnace. Positioned on top of the support block 33 is a carrier 34 such as wire screen having the edges thereof turned upwardly, as shown at 35 and 36. Positioned within the pan-shaped screen or carrier 34 are metal rods 37 and 38 which extend, respectively, along the sides 35 and 36. In some instances, it may be desirable to employ rods along the other edges of the screen carrier, but ordinarily a pair of rods is sufficient, and these rods are used in a subsequent fabrication step wherein the sintered metal unit is formed into a useful configuration. The pan-shaped screen is filled with sintered metal particles, as shown at 39.

The illustration of Figure 2 is somewhat enlarged, for the rods 37 and 38 have a small diameter and the screen 34 is barely turned up at the edges thereof. The function of the upturned edges is to define a pan for confining the sintered metal particles 39 therewithin. If it is permissible to have the particles slope slightly at the edges of the screen, such edges need not be turned up; and this is similarly true if other means are employed to confine the particles. Ordinarily, the thickness of the mass of particles 39 will be about two to three layers, as shown in Figure 4, but of course can be more or less than this as desired.

In order to utilize the full capacity of the furnace 15, it is advantageous to stack a plurality of the sintered metal units, which for identification are denoted in general with the numeral 40, one upon another; and in this event, separator sheets 41 are interposed between the successive units. The strips 41 should be formed of a material such as stainless steel, which will not bond to the particles 39 or to a wire screen carrier thereabove. In Figure 2, four sintered metal units are illustrated, and for the purpose of differentiation they are separately indicated with the numerals 40, 40a, 40b and 40c. Since the components thereof are identical with those described in connection with the unit 40, no further description thereof will be set forth.

After the stacks 26 have been completely passed through the furnace 15, the individual units may be separated therefrom and are seen to comprise an integrated sheet, as shown in Figures 3 and 4, wherein the particles are bonded to each other, to the screen carrier 34 and to the wires 37 and 38. In order to distinguish the integrated or completed unit from the units 40 illustrated in Figure 2, the numeral 42 is used to denote the same. Similarly, the coating as shown in Figures 3 and 4, is indicated with the numeral 43 to distinguish it from the mass 39 of particles, and the individually bonded particles are separately identified with the numeral 44.

For convenience, the individual sintered metal particles 44 are shown as spheres, but their actual configuration may vary substantially therefrom. On the other hand, the surfaces of the particles are curved and are relatively smooth. Thus, the particles engage each other at points of contact, and it is at such points that the bonds 45 occur therebetween. The layer of particles 44 contiguous with the screen 34 is bonded thereto at the points of contact between the particles and screen, as shown by the numeral 46. Since this type of bonding occurs, it is apparent that a loose or porous lattice is afforded which permits the passage of fluid therethrough, but is of course effective to filter or constrain particulate matter carried by the fluid. The filtering action will be greater if the particles 44 are smaller. In many instances, it is convenient to employ particles having a diameter or at least one dimension which exceeds the size of the openings provided through the screen 34, but this is not essential.

After the flat or planar units 42 have been fabricated, they may be shaped into desired configurations to form filter units. One such configuration is the circular tube or cylinder 47 shown in Figure 6, or the prismatic cylinder 48 shown in Figure 7. It will be apparent that other shapes may be formed, and the circular and prismatic cylinders are simply exemplary thereof. In certain instances, it may be necessary to form an exceptionally large filter, and it may be more convenient to make the same by gently curving a plurality of units 42 and securing the same together to define a composite cylinder 49. Whatever be the shape desired, any corners thereon should be rounded so that the elastic limit of the bonds between the sintered metal particles is not exceeded. Thus, in the prismatic form shown in Figure 7, the corners thereof are slightly rounded.

The shape of the filter units is maintained by securing the rods 37 and 38 together, as shown more particularly in Figure 9. This is accomplished by welding, soldering or brazing the rods together as at 50 throughout the length thereof so as to form a completely closed cylinder, whereby all of the fluid entering the interior thereof must flow through the sintered metal coating 43. Whatever process is used to secure the rods together, the temperatures attained should be less than the melting or brazing temperature of the sintered metal particles.

It has been found that in joining the rods 37 and 38, the solder or other material employed in effectuating the union is carried away by the capillary action of the screen 34 and sintered metal coating 43 about as rapidly as it is formed. Consequently, prior to the joining of these members, it is advantageous to remove a portion of the screen and sintered metal along the undersides of the rods as shown at 51 and 52 in Figure 9. The material may be removed in a grinding operation wherein the screen and sintered metal, and perhaps a portion of the rods themselves, are tapered inwardly so that a V is defined when they are brought together.

After the sintered metal units 42 have been shaped as shown in Figures 6 and 7, or have been assembled into a filter unit as shown in Figure 8, they have metal end caps 53 and 54 affixed thereto (see Figure 5)—the latter of which may be equipped with a fitting or nipple 55 to enable the same to be connected in a fluid flow line. Usually, the caps 53 and 54 will be solid metal members, and as a consequence, the fluid flow into the interior of the filter will be through the filter unit 47 only. The end caps may be attached by any suitable means, such as by equipping the same with skirts or flanges which nestingly receive the ends of the filter unit 47 therein, and that are held in place by the elongated bolt 53a extending through the cap 53 which threadedly engages the straps 54a secured to the cap 54. An exemplary use for the filter unit shown in Figure 5 is disclosed in my copending application, Serial No. 625,135, referred to hereinbefore.

In the event that flat filter units are needed for direct insertion into a fluid flow line, for example, they may be stamped from the sintered metal unit 42 shown in Figure 3, and may have a flat, circular shape as shown by the disc 56 of Figure 10.

A modified stack arrangement for passage through the furnace 15 is shown in Figure 11, and is denoted generally with the numeral 57. This stack comprises a flat graphite plate or block 58 similar to the block 33 heretofore described, and a die or mold 59. The upper surface of the die 59 is flat so that it may serve the function of the support block 58 for units stacked thereabove, but the underside thereof is configured so as to nestingly receive the rods 60 and 61 therein, and the intermediate portion between the rods is removed so that a mass 62 of sintered metal particles can be inserted thereinto. A screen carrier 63 extends along the face of the support block 58, and is similar to the screen 34 except that the edges thereof are not turned upwardly.

The dies 59 then function as composite dies and separators, and the mass of particles may be inserted into the dies after they are stacked as shown in Figure 11, through an open end thereof. For differentiation, the plurality of stacked units shown in Figure 11 is designated with the numerals 64, 64a and 64b.

The method disclosed is advantageously employed for it permits full utilization of the furnace capacity in fabricating sintered metal products. Heretofore, if a filter was to be fabricated having the shape of the one shown in Figure 5, it was necessary to provide a die or mold in that configuration which, of course occupied a substantial area on the conveyor 22 and likewise in the furnace, whereby a serious restriction was imposed on the capacity thereof. Furthermore, the size of the products which could be moved through the furnace was limited by the size of the openings 16 and 17 thereof, which are made small in order to prevent excessive escape of heat from the interior of the furnace. The present invention permits sintered metal units to be passed through the furnace as flat units whereupon they are capable of being stacked one upon another, with the result that the full furnace capacity is utilized and there is no serious limitation as to product size.

In the past, sintered metal units have been much too brittle to bend or otherwise shape, so such units were necessarily shaped beforehand by the dies that contained the same. Quite surprisingly, I have found that where a carrier 34 or 63 is used in conjunction with a coating of sintered metal, flat units acquire the property of being bendable into various shapes without the fracture of the bond between the metal particles. Thus, the inclusion of the carrier appears to lend a new property to the sintered metal body—one that enables the same to be shaped after its formation. Further, when filters are made in accordance with the invention, the filtering efficiency thereof is improved; and one reason therefor appears to be due to the uniformity of the sintered metal coating which seems to result from the absence of die weights pressing thereagainst during the bonding process.

The mass of particulate material has been referred to herein as comprising sintered metal particles since this reference is convenient, and because sintering procedures are most frequently thought of in terms of particulate metals. However, materials other than metals—such as nylon and other plastics, for example—are contemplated by this invention, and the term "sintering" is employed in its fundamental sense to mean the uniting of smaller particles into a larger body by the application of heat thereto. It may be noted that the perforate carrier 42 should have a melting temperature that exceeds the sintering temperature of the particles employed; and similarly, the rods 37 and 38 should have the same characteristic. The separator sheets 41 should also have a relatively high temperature so that the particles will not adhere thereto during the sintering process.

The filter unit which is made in accordance with this invention, is functionally superior to sintered filters heretofore made for the reason that the same degree of filtering is attained with a smaller pressure drop thereacross. This is apparent if it is remembered that the primary filtering action occurs at the surface of the filter and, consequently, a thin layer of filtering material is all that is necessary to attain the requisite filtering action. However, it has in the past been necessary to obtain multiple layers of sintered particles in order to obtain sufficient structural strength in the unit. As a result, the pressure drop across the filter increased in proportion to the number of layers employed without substantially altering the filtering characteristics thereof. With the present invention, a thin coating of sintered particles is all that is required, for the structural strength is provided by the perforate or wire screen carrier.

Moreover, sintered particles are quite expensive, and minimizing the quantity needed in each filter substantially reduces the cost thereof. In addition, a dual function is ascribed to the screen 42 in that this member initially serves as a mold to confine the mass of particles during the sintering process, and thereafter becomes a structural part of the completed filter.

While in the foregoing specification embodiments of the invention have been set forth in considerable detail, both as to a method and to structure, for purposes of making an adequate disclosure thereof, it will be apparent to those skilled in the art that numerous changes may be made in those details without departing from the spirit and principles of the invention.

I claim:

1. In the fabrication of a sintered metal filter, the steps of providing a plurality of separator sheets that are resistive to the adherance of metal thereto at sintering temperatures and supporting a wire screen upon each such separator sheet, placing a pair of metal rods on each of said wire screens along opposite edges thereof, sustantially filling the space defined along each of said wire screens between the pair of rods supported thereon with a plurality of metal particles but to an elevation that does not substantially exceed at any point therealong the uppermost elevation defined by said rods, stacking said separator sheets such that the rods positioned along the screen of one separator sheet support the separator sheet disposed thereabove with the result that substantially no compressive forces are exerted against the metal particles, passing the resulting stack through a furnace to subject the stack to sintering temperatures whereupon the wire screen, rods and metal particles supported by each separator sheet are bonded one-to-the-other, removing said stack from such furnace, thereafter forming each unitary screen, rod and particle structure into a hollow filter unit, and securing the rods of each filter unit together so as to prevent the flow of filterable fluid between said rods.

2. The method of claim 1 in which the step is provided of removing portions of the screen and any particles therealong that would contact the contiguous surfaces of the rods when the rods are brought together to secure one to the other in the formation of a hollow filter unit.

3. In the fabrication of a fluid-pervious body adapted for use as a filter media, the steps of providing a plurality of separator sheets resistive to the adherence thereto of sintering particles at the sintering temperatures therefor and respectively supporting a plurality of perforate carriers upon said sheets, placing a pair of spaced apart rods on each of said carriers along opposite edges thereof, substantially filling the space defined along each of said carriers and between the spaced rods supported thereon with a plurality of sintering particles but to an elevation that does not substantially exceed at any point therealong the uppermost elevation defined by said rods, stacking said separator sheets such that the rods positioned along the carrier on one separator sheet support the separator sheet disposed thereabove with the result that substantially no compressive forces are exerted against the sintering particles on one separator sheet through the separator sheet disposed thereabove, passing the resultant stack through a furnace to subject the stack to sintering temperatures whereupon the carrier, rods and particles supported by each separator sheet are bonded one to the other, and removing said stack from the furnace to permit each unitary carrier, rod and particle structure to cool prior to including the same in a filter unit.

4. The method of claim 3 in which the additional step is included of confining each of said pairs of rods in a predetermined position along the associated carrier so that said rods define positive terminal edges for the sintering particles contained therebetween.

5. The method of claim 3 in which the additional step is included of forming each of said unitary bodies into a filter structure and securing the adjacent rods one to another to prevent the flow of fluid therethrough.

6. In a filter structure for use in separating foreign materials from a fluid flowing therethrough, a hollow porous filter unit through which such fluid flows between the exterior and interior thereof and comprising a malleable perforate carrier and a layer of sintered particles coating the exterior surface of said carrier and a pair of rods oriented in contiguous relation and defining the adjacent marginal edges of said carrier and layer, said carrier and rods being sinter-connected to said layer to define a unitary filter unit, and said rods being bonded to each other throughout substantially the entire length thereof so as to prevent the passage of such fluid therebetween.

7. The filter unit of claim 6 in which said rods define a generally V-shaped configuration along the interior of said hollow unit so as to space said layer of particles from the contiguous and bonded surfaces of said rods.

8. The filter unit of claim 7 in which said rods, particles and carrier are metal, and in which said metal particles are a copper composition.

References Cited in the file of this patent

UNITED STATES PATENTS

| | | |
|---|---|---|
| 2,122,053 | Burkhardt | June 28, 1938 |
| 2,267,918 | Hildabolt | Dec. 30, 1941 |
| 2,457,051 | Le Clair | Dec. 21, 1948 |
| 2,554,343 | Pall | May 22, 1951 |

OTHER REFERENCES

"Materials and Methods," vol. 41, April 1955, pages 98–101.